United States Patent [19]

Esposito et al.

[11] Patent Number: 5,452,441
[45] Date of Patent: Sep. 19, 1995

[54] SYSTEM AND METHOD FOR ON-LINE STATE RESTORATION OF ONE OR MORE PROCESSORS IN AN N MODULE REDUNDANT VOTING PROCESSOR SYSTEM

[75] Inventors: Daniel Esposito; Douglas A. Reneker, both of Naperville, Ill.

[73] Assignee: AT&T Corp., Murray Hill, N.J.

[21] Appl. No.: 220,136

[22] Filed: Mar. 30, 1994

[51] Int. Cl.⁶ .............................................. G06F 11/00
[52] U.S. Cl. ........................... 395/182.11; 395/182.08; 395/182.13; 395/182.21
[58] Field of Search ................. 395/575, 200; 371/9.1, 371/11.3, 36, 68.3

[56] References Cited

U.S. PATENT DOCUMENTS

| | | | |
|---|---|---|---|
| 3,665,173 | 5/1972 | Bouricius et al. | 235/153 |
| 4,015,246 | 3/1977 | Hopkins et al. | 340/172 |
| 4,239,982 | 12/1980 | Smith et al. | 307/219 |
| 4,665,522 | 5/1987 | Lala et al. | 371/36 |
| 4,907,232 | 3/1990 | Harper et al. | 371/36 |
| 4,965,717 | 10/1990 | Cutts et al. | 364/200 |
| 4,967,347 | 10/1990 | Smith et al. | 364/200 |
| 5,117,442 | 5/1992 | Hall | 375/107 |
| 5,146,589 | 9/1992 | Peet et al. | 395/575 |
| 5,276,823 | 1/1994 | Cutts, Jr. et al. | 395/575 |
| 5,317,726 | 5/1994 | Horst | 395/575 |

*Primary Examiner*—Vincent P. Canney
*Attorney, Agent, or Firm*—Michael B. Johannesen

[57] ABSTRACT

A system and method for restoring an operating N module redundant NMR) processors when one or more processors is in an out-of-service state. This NMR system comprises N processors each having an individual memory system. An interconnection network is configured to receive data from all N processors, and N voters are connected between the interconnection network and each of the N processors to receive data from the interconnection network and vote on data destined for the N processors. Writes of data from the active processors are rerouted to the interconnection network. Advantageously, there are registers in the interconnection network corresponding to each processor. These registers receive the data from their corresponding processors, and then send the data to all of the voters. The data is voted on and sent to all N processors. Thus, the memories of the out-of-service processors are restored with the active processors while the active processors continue to operate.

17 Claims, 3 Drawing Sheets

SYSTEM AND METHOD FOR ON-LINE STATE RESTORATION OF ONE OR MORE PROCESSORS IN AN N MODULE REDUNDANT VOTING PROCESSOR SYSTEM

TECHNICAL FIELD

This invention relates to the field of highly reliable voting processors, and, more specifically, to the area of restoring one or more out-of-service processors to the same state as the active processors while the active processors are on-line.

BACKGROUND OF THE INVENTION

Highly reliable N module redundant (NMR) voting processors are a special class of processor which have been used for mission-critical applications for some time. These systems generally comprise multiple processor (N in number) that are all operating approximately synchronously; that is, each processor in system is operating on the same instruction and data at the same time. When the processors perform certain functions, for example, I/O, the data items that each of the processors are working on are compared in a special circuit, called a "voter," which determines whether all of the processors have the identical data item. For example, of the processors were performing an add and store function, the values that are stored are compared in the voter for conformity among the processors. If one (or more) of the values are different, then the value that the majority reports is selected and stored; and the odd value(s) is discarded. In some systems, the processor that does not have the same data value is removed from service. In this manner, a processor that has a "fault" does not affect the entire system.

A problem with the existing systems is that a faulty processor cannot be repaired and restored while the multiple processor system is running, because once a processor stops it cannot be restored to the same state as the other processors without stopping and restarting all processors. Each processor has its own memory, registers and peripheral states that are used for processor. All of the data (i.e., control, addresses, data and other information used by the system) in the active processors must be copied to the out-of-service processor. However, if the processors are operating, the data is constantly changing and the copy function cannot copy all the data fast enough to not disrupt operations. The purpose of such a multiprocessing system, however, is to have all processors performing the same instruction at approximately the same time with the sane data; thus, copying exactly the same data into the out-of-service processor is critical to reestablishing it.

As stated above, the only way to restore an NMR processor system is to shut it down, restore the faulty processor and restart the system. This method of repair is adequate (but not desirable) for mission-critical applications, when, after the mission is over, the system may be shut down and the faulty processor repaired. However, for applications requiting reliable processing at all times (such as nuclear power plants, air traffic control and telephone switching offices), such off-line repair is not adequate. Thus, NMRs cannot currently be used in such long-term reliability applications, even though their reliability is higher than the typical single redundant systems currently in use.

Therefore, a problem in the art is that there is no method for resynchronizing a NMR processor with other processors of the NMR system are actively processing.

SUMMARY OF THE INVENTION

This problem is solved and a technical advance is achieved in the art by a system and method for restoring the memory and registers of an N module redundant (NMR) processors when one or more of the processors are out of service and the remainder are active. This NMR system comprises N processors each having an individual memory system, wherein each of the memory systems store data being used for processing. In accordance with this invention, when a processor in this NMR system is being restored, an interconnection network is configured to receive data from all active processors each time these processors write to memory. The data is then sent from the interconnection network to voters. The voters vote on the data and send the same data to all N processors, including any processors being restored. Thus, the memories of the out-of-service processors can be synchronized with the active processors. Advantageously, there are registers in the interconnection network that receives the data, and then send the data to all of the voters (such registers may include address translation, if necessary).

A method for restoring the memory state and registers of out-of-service processors in an NMR processing system (as outlined above) comprises the steps of, first, rerouting all writes that normally pass from the active processors to their individual memory systems to an interconnection network. Then, for each block of memory in the processor system, the block is read and then written. The write is intercepted and sent to the interconnection network which causes the data to be delivered to all of the voters. The voters vote on the received data and pass the voted-on data to all N processors. All N of the processors write the data into their respective memory system. After memory has been copied, registers, memory management, co-processor, and other device data is written to a special block of memory. A final command causes all N processors to reload registers, etc., from the special block of memory and become active. Thus, the memory systems of the out-of-service processors are restored to the same state as the active processors, and the out-of-service processor can then be made active with the others.

DETAILED DESCRIPTION

Figure 1:
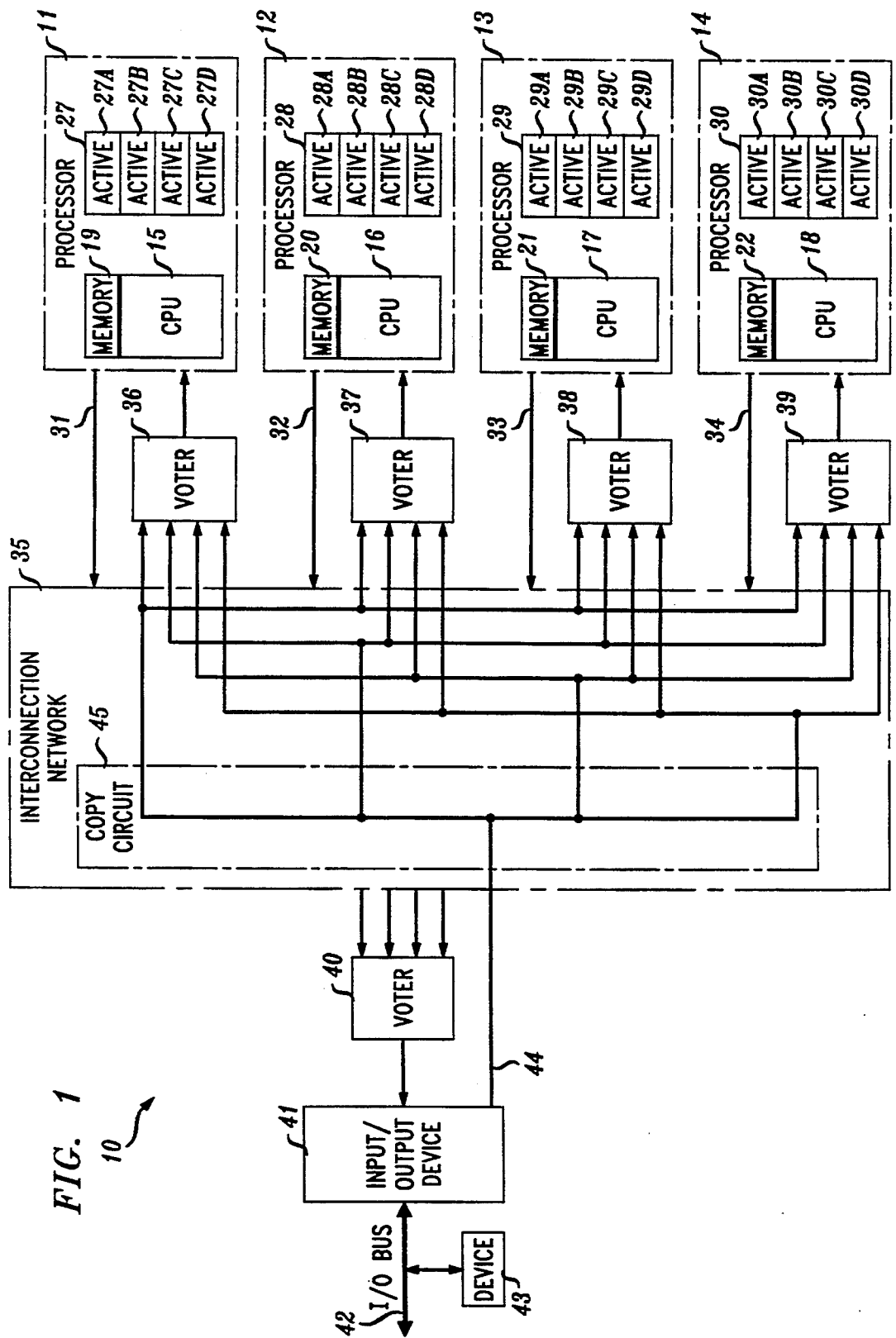
FIG. 1 is a block diagram of a four module redundant voting processor architecture which can be repaired and restored while on-line, according to an exemplary method of this invention.
Figure 2:
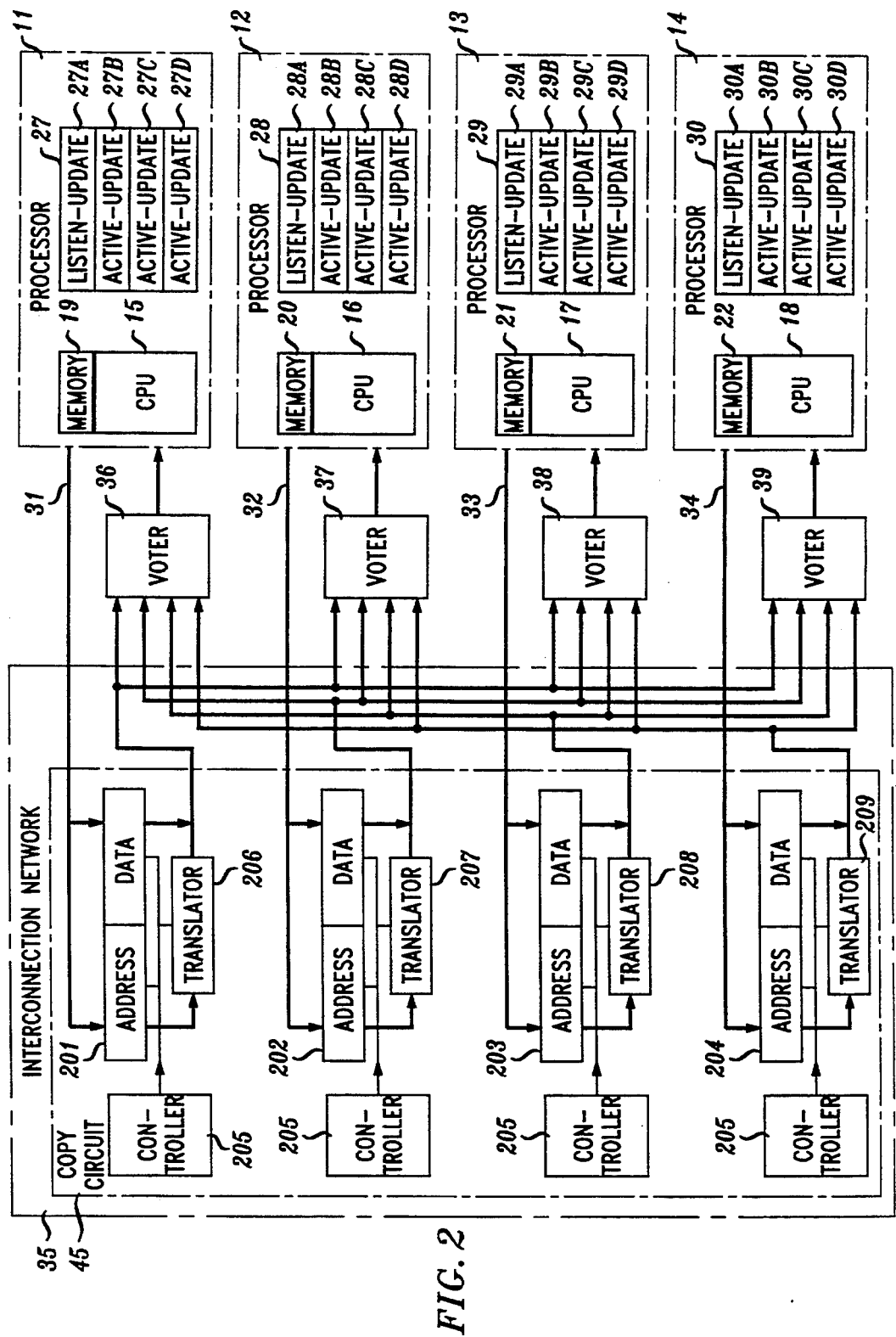
FIG. 2 is a block diagram of the four module redundant system of FIG. 1 illustrated with one module being restored.

FIG. 1 is a block diagram of a typical N module redundant processor system (NMR) in which an exemplary embodiment of this invention may operate. This exemplary embodiment contains four processors 11, 12, 13, and 14, making it a four modular redundant (4MR) system. A 4MR system is used for illustration only, as this invention may operate in any NMR processing system. In this illustrated embodiment, as in the prior art, when all processors are active, they all operate substantially synchronously, (i.e., all processors execute the same instruction at approximately the same time on the same data). Processors 11, 12, 13, and 14 are identical and each comprises CPU 15, 16, 17, 18 and memory 19, 20, 21, and 22, respectively. Processors 15, 16, 17, and 18 use on-board memory 19, 20, 21 and 22 for storing data and instructions as is also known in the art. Them are other circuits, such as memory management units, co-processors, caches, etc., which are well known in the art and are not shown for clarity. CPUs 15, 16, 17, and 18 also include internal registers for temporarily storing data, as known in the art. A register in processors 11, 12, 13, and 14 used by CPUs 15, 16, 17, and 18 is status register 27, 28, 29, and 30, respectively, according to an exemplary embodiment of this invention. Status registers 27, 28, 29, and 30 control the mode of operation of the processor and, as will be described below with respect to FIG. 2, are used in restoring an out-of-service processor to the active state. Status registers 27, 28, 29, and 30 are written by the active processors, and the write of the register is voted on. Each status register, i.e., 27, contains the status of all N processors (27A, B, C, and D). The operation of CPUs 15, 16, 17, and 18 are controlled by their respective status register (A, B, C, D). Thus, in the example of FIG. 1, all four CPUs are active. If, for example, CPU 15 had a fault, processors 12, 13, and 14 could force processor 11 out-of-service by writing status registers 27, 28, 29, and 30 with "out-of-service" in A, and "active" in B, C, and D. CPU 15, and hence processor 11, would then stop processing.

Processors 11, 12, 13, and 14 are connected via outgoing links 31, 32, 33, and 34, respectively, to an interconnection network 35. Interconnection network 35 connects processors 11, 12, 13, and 14, to I/O devices. As is common in NMR processing, there are voting devices at I/O boundaries. To this end, voters 36, 37, 38, and 39 are at the boundary between the interconnection network 35 and processors 11, 12, 13, and 14, respectively. Voters 36, 37, 38, and 39 receive data from the interconnection network and vote on the data content. The data item that is most common, i.e., the data that is the same across the greatest number of processors, is passed from the voters 36–39 to the processors 11–14. Four voters 36, 37, 38, and 39 are shown in this exemplary embodiment. Alternatively, one voter may be connected to receive data from interconnection network 35 and send identical voted-on data to processors 11, 12, 13, and 14.

There is also a voter 40 connected between interconnection network 35 and input/output device 41. Voter 40 receives I/O commands, addresses, and data from processors 11, 12, 13, and 14, via interconnection network 35 and votes to determine the most common data content for each I/O operation. The common data is then moved to input/output device 41 and sent on I/O bus 42 to devices 43 (devices 43 may be disk systems, interfaces to other systems, etc.). Responses from devices such as 43 are sent to processors 11, 12, 13, and 14 via I/O bus 42 through input/output adapter 41, and via connection 44 into interconnection network 35. Interconnection network 35 replicates the data in copy circuit 45 and sends it to voters 36, 37, 38, and 39, and hence into processors 11, 12, 13, and 14.

Turning now to FIG. 2, the operation of this invention in the context of the 4MR processor of FIG. 1 is illustrated. In this example, initially, processors 12. 13, and 14 are active and processor 11 is out-of-service, according to status register, A, B, C, and D. More than one processor could be out of service and brought back into operation using the exemplary embodiment of this invention; however, for the purpose of clarity, only processor 11 will be described as being restored. It is assumed that out-of-service processor 11 has been repaired or replaced as necessary After processor 11 has been repaired, its memory, registers and peripheral unit states need to be restored with data from currently active processors 12, 13, and 14. Further, since the exemplary embodiment of this invention may be operating in a critical situation (i.e., operating a live telephone office), processors 12, 13, and 14 cannot be stopped while processor 11 is loaded. Therefore, restoration must use only a small portion of real time, the majority being reserved for processing. Typically, processing cannot be stopped for more than 100 milliseconds at a time.

According to the exemplary embodiment of this invention, a systems operator requests a restore for the repaired processor 11, which causes the processors to change the status words in registers 27, 28, 29, and 30. The status of out-of-service processor 11 changes from "out-of-service" to "listen-update" in register A. Active processors 12, 13, and 14 change status from "active" to "active-update" in registers B, C, and D. In response, processor 11 halts so that it will not perform any processing that may affect memory. Processors 12, 13, and 14 continue to operate as before. However, all writes to local memory (i.e., memory 20, 21, 22) are no longer performed locally. The system is now in a mode where the copy function will automatically occur for all writes to local memory.

In this state, when the NMR processors 12, 13, and 14 perform a local memory write (which is physically carried out by each processor), the active-update mode causes the write to be diverted from processors 12, 13, and 14, through connections 32, 33, and 34 into copy circuit 45. Copy circuit 45 includes a plurality of address and data buffers 201, 202, 203, and 204. These buffers are connected to lines 31, 32, 33, and 34, respectively, for receiving address and data information from processors 11, 12, 13, and 14 respectively. Addresses and data are only received from the processors in the active-update mode. Therefore, the address and data for all local writes from processors 12, 13, and 14 are written to buffers 202, 203, and 204 respectively.

Such diversion of local writes may be implemented in one of several ways. For example, the active-update mode may cause address decoding to be altered on each processor 12, 13, and 14, so that memory writes (both address and data) are directed to copy circuit 45 by an on-processor decoder. The decoder operates such that a write normally in the address spectrum of memory is diverted to lines 32, 33, 34, and into buffers 202, 203, and 204. Alternatively, a memory management unit may be temporarily reprogrammed (as part of switching to active-update mode) so that the virtual-to-physical address translation alters physical addresses. Instead of pointing to memory, the address and data is now written to an address which implies copy circuit 45 (an address range is assigned to the copy circuit as if it were in the main memory).

In response to addresses and data being written into buffers 202, 203, and 204, controllers 205 initiate a write-back from copy circuit buffers 202, 203, and 204 to processor memories 19, 20, 21, and 22. The writeback requires a translation to change the physical address back to the original one (if the MMU address mapping scheme was used). To this end, translators 206, 207, 208, and 209 perform the address translation to an address of memory 19, 20, 21, and 22. All addresses and data should be identical, according to the intent of an NMR processor system.

The write-back is initiated from the three registers 202, 203, and 204 connected to processes 12, 13, and 14 in active-update mode. The address and data is delivered to all voters 36, 37, 38, and 39, and all processors are written with a 3-for-3 vote (assuming no new faults). (A listen-update processor copy circuit 201 does not contribute data and hence does not participate in the vote). Thus, each time the NMR writes a memory location in processors 12, 13, and 14, all four processor memories 19, 20, 21, and. 22 are written. There is, of course, a minor performance penalty due to the longer write path.

Updating processor 11 in this way can be accomplished using a "scrubber" software process according to an exemplary embodiment of this invention, and can be run using a portion of the NMR real-time to update processor 11 memory one block at a time. This scrubber process can simply read a block of memory locations and write it back. This write affects all four memories, as described above, not just the three active ones. The scrubber process runs periodically and updates memory a block at a time. After this read/write operation is performed for a block of memory, the scrubber process is idle in the background while normal system processing runs. Of course, during system processing, memory locations that were already updated may be altered. This is acceptable, because the active-update settings cause all writes to affect all four processors.

After the last block of memory is copied, the scrubber process writes all register state information on CPUs 16, 17, and 18 to memory. Additionally, all memory states from memory management units, co-processors, and other peripheral processor units are written to memory. This process ends by writing the system mode for all processors to "active." When each processor is made "active" it runs a program that loads the registers from the memory block. Also, all caches are flushed, and other actions taken so that all processors are restored to the last operative state. At this point, the scrubber terminates, and all four processors are now restored to identical states.

Figure 3:
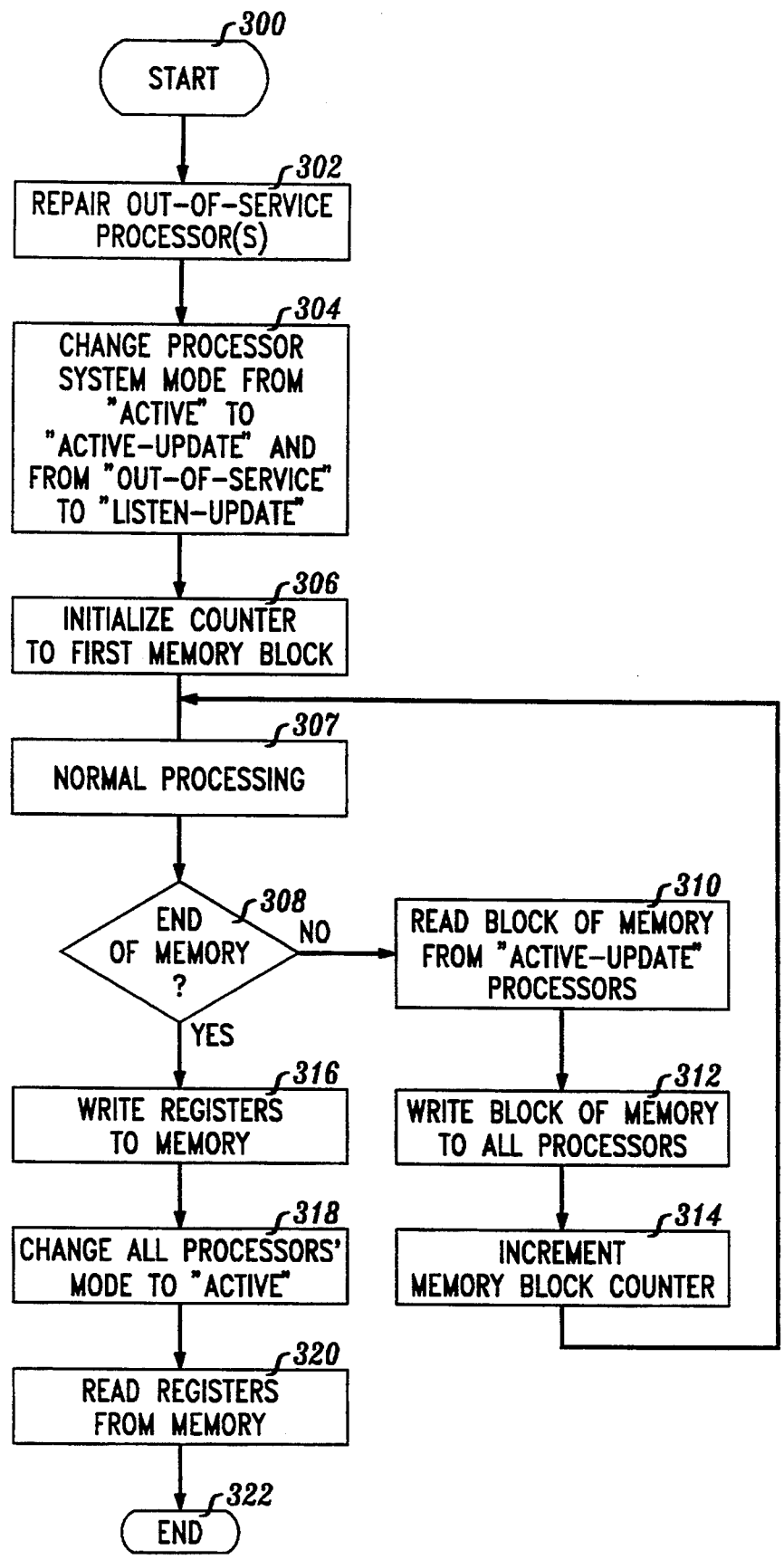
FIG. 3 is a flow chart of processing in the four module redundant system of FIG. 2 illustrating restoral of the out-of-service module according to an exemplary method of this invention.

Turning now to FIG. 3, a flow chart of the operation of the restoration process, including in particular the scrubber process, as described above in connection with FIG. 2 is shown. Processing begins at circle 300 and moves to action box 302. In action box 302 the out-of-service processor or processors are repaired. Processing continues to action box 304 where the active processor system mode is changed from "active" to "active-update," and the out-of-service processor's modes are changed from "out-of-service" to "listen-update." Processing continues to action box 306 where a memory block counter is initialized to the first memory block.

Processing moves to normal processing 307. Periodically, normal processing is interrupted. Processing moves to decision diamond 308 (the control for a loop). In decision diamond 308, a check is made to determine if the memory block currently being examined is the last memory block. If it is not, then processing continues to action block 310 where a block of memory from 20, 21, and 22 (FIG. 2) is read. Processing continues to action block 312 where the block of memory just read is written. The write is sent to the interconnection network 35 and the copy circuit 45 (FIG. 2) where, as stated above, the data is moved into buffers, the address is translated, and then the data is written back to all of the processors. After the block of memory has been written, the memory block number in the memory block counter is incremented (in box 314) and processing returns to normal processing box 307. Processing continues on a timeshare basis with normal processing until all blocks of memory have been read and written.

When, in decision diamond 308, the end of the memory is reached, then processing continues to action box 316, where all registers local to the processors are written to memory in a manner equivalent to the operation of box 312 (i.e., all processor memories receive a copy). Processing continues to action box 320 where all of the processor's mode is changed to "active." In action box 320, registers and other information written into memory in box 316 are loaded into the CPUs as part of changing the mode to "active." All of the memory and registers for the formerly out-of-service processor are now updated and the formerly out-of-service processor is synchronized with the other processors. Processing of the restore function ends in circle 322.

It is to be understood that the above-described embodiments are merely illustrative principles of the invention, and that many variations may be devised by those skilled in the art without departing from the scope of this invention. It is, therefore, intended that such variations be included within the scope of the appended claims.

We claim:

1. A method for restoring one or more processors in an N module redundant (NMR) processing system, when said one or more processors are in an out-of-service state and the other processors are in an active state, said NMR system comprising N processors each having an individual memory system, an interconnection network configured to receive data from said processors; and means for returning said data received from said active state processors to all of said N processors via voting means connected between said interconnection network and said processors for receiving data from said interconnection network and voting on data to be received by said N processors, said method comprising the steps of:

rerouting all writes of data from said active processors to said interconnection network;

said interconnection network receiving said data and causing said data from each active processor to be delivered to said voting means;

said voting means voting on said data received from each active processor and passing the voted-on data to all N processors; and all of said processors writing said data into their respective memory system, so that said memory systems of said one or more out-of-service processors is restored with data from said active processors.

2. A method according to claim 1 further including iteratively reading said data from said memories of each said active processors and writing said data back to the memories of all N processors.

3. A method according to claim 2 wherein said memory of each processor is divided into blocks, and said step of reading said data comprises reading said data one block at a time.

4. A method according to claim 3 wherein said active processors perform other processing between iterations of reading data.

5. A method according to claim 1 wherein said processors further include registers containing data, and wherein said method further includes the step of reading said processor registers and delivering said data from said processor registers to said interconnection network, said interconnection network sending said register data to said voting means, which after voting on said data, sends it to all N processors.

6. A method according to claim 5 wherein, after all memory blocks have been restored and said registers have been restored, making all N processors active.

7. An N module redundant (NMR) processing system, that may be restored while the system is processing, comprising:

N processors, each processor having memory, each memory containing data, wherein each of said N processors may be active or inactive;

an interconnection means for interconnecting said N processors to other devices and to each other;

N voting means connected between said interconnection means and said N processors, for receiving N data items and determining which of N data items is the majority; and means for rerouting data from said N processors to said interconnection means, so that data from active processors is routed through said interconnection means and said voters and delivered to one or more inactive processors, whereby said memory of said inactive processors is restored.

8. An NMR processing system according to claim 7 wherein said processors further including registers containing data, said system further including means for copying said data in said registers to said interconnection means so that said data is sent to said voters and from said voters to said one or more inactive processors.

9. An NMR processing system according to claim 7, wherein said interconnection means includes N registers for receiving and storing data from said memory.

10. An NMR processing system according to claim 9 wherein each of said N registers is connected to one of said N voters, so that all data moving from said registers to said N processors is voted on.

11. An N module redundant (NMR) processing system, comprising;

a plurality of processors connected to a plurality of individual memory systems, wherein one or more of said plurality of processors is out-of-service and the rest are active;

an interconnecting network configured to receive data from said active processors; and means responsive to said one or more out-of-service processors changing to an update mode for returning said data received from said active processors to all of said plurality of processors, whereby said memory for said one or more update processors is updated along with the memories of said active processors.

12. An NMR processing system according to claim 11 further including voting means connected between said interconnection network and said processors for voting on all data passed from said interconnection network to each of said processors, said voting means voting on said writes and passing the most agreed-to data to said processors.

13. An NMR processing system according to claim 12 comprising one voting means for each processor.

14. An NMR processing system according to claim 12 comprising one voting means for said system.

15. An NMR processing system according to claim 11, wherein said interconnecting network includes a plurality of registers for receiving said data from said active processors.

16. An NMR processing system according to claim 14, further including address translation means for translating addresses at said plurality of registers.

17. An NMR processing system according to claim 14 wherein said means for returning said data includes controller means for determining when data is present in said plurality of registers and causing said data to be returned to all of said plurality of processors.

* * * * *